July 6, 1965 W. C. KROEGER ETAL 3,192,875
DUMPING APPARATUS FOR A VEHICLE MOUNTED TILTING SLAG POT
Filed Jan. 31, 1962 4 Sheets-Sheet 1
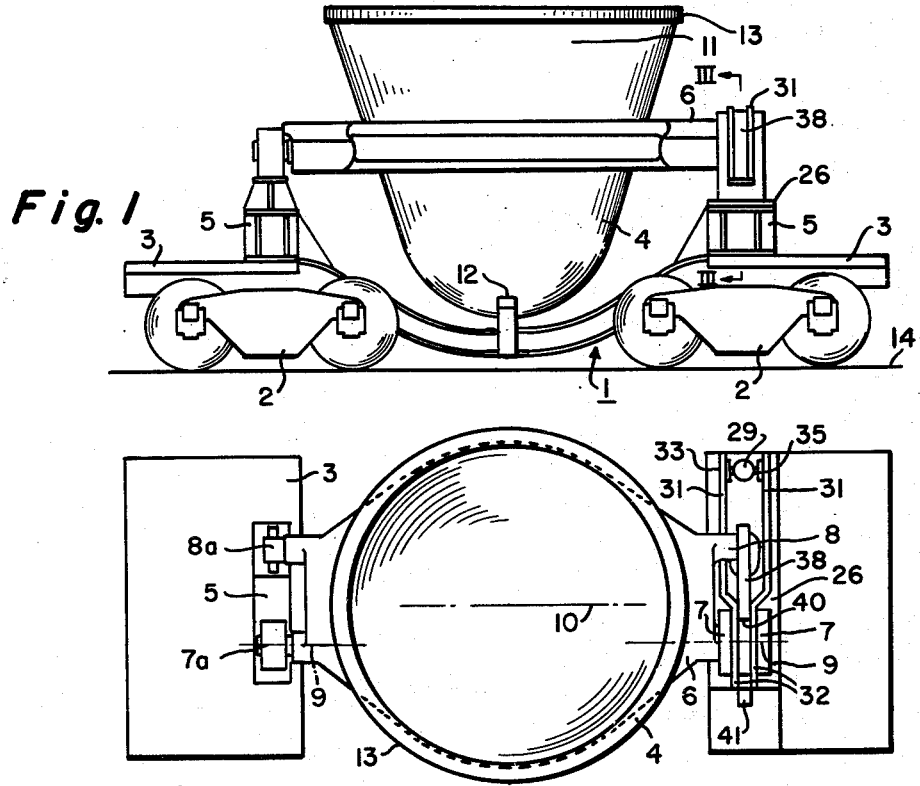
Fig. 1
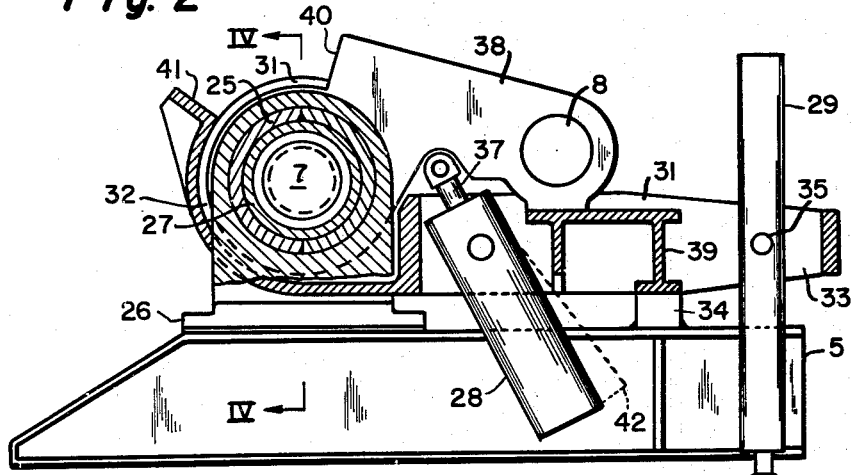
Fig. 2
Fig. 3
INVENTORS.
William C. Kroeger
William M. Loupe
BY Webb, Mackey & Burden
THEIR ATTORNEYS July 6, 1965 W. C. KROEGER ETAL 3,192,875
DUMPING APPARATUS FOR A VEHICLE MOUNTED TILTING SLAG POT
Filed Jan. 31, 1962 4 Sheets-Sheet 2
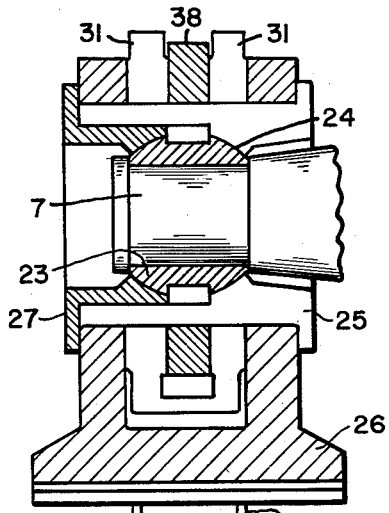
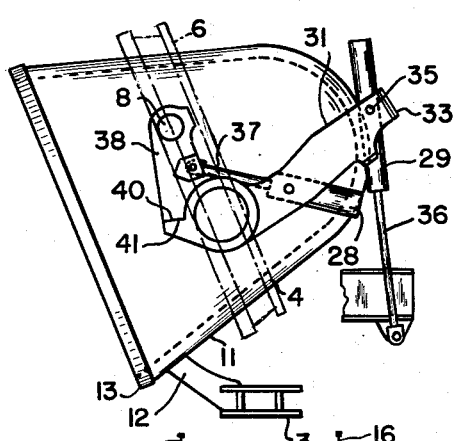
INVENTORS.
William C. Kroeger
William M. Loupe
BY Webb, Mackey & Burden
THEIR ATTORNEYS

United States Patent Office 3,192,875
Patented July 6, 1965

3,192,875
DUMPING APPARATUS FOR A VEHICLE MOUNTED TILTING SLAG POT
William C. Kroeger and William M. Loupe, Youngstown, Ohio, assignors to The William B. Pollock Company, Youngstown, Ohio, a corporation of Ohio
Filed Jan. 31, 1962, Ser. No. 170,195
9 Claims. (Cl. 105—271)

This invention relates to apparatus for dumping a slag pot which is filled or partially filled with slag or a mixture of slag and metal from open hearth, electric furnaces, basic oxygen furnaces, blast furnaces or any slag producing furnace in an iron or steel plant. In the case of a blast furnace, the pot in a wheeled vehicle is positioned to receive slag as it flows from the blast furnace slag runners, and in the case of an open hearth, electric furnaces, and basic oxygen furnaces, the pot is usually placed where it collects excess slag formed during the steelmaking, and on occasion where it receives the slag remaining after completion of a heat of steel. The pots are transferred by a crane to and from a vehicle such as a railroad car or truck for conveying them to a slag dump or to a place where the slag is converted into expanded slag for use such as aggregate in the production of cement and cement products.

At the slag dump or the place for producing expanded slag, the pot, while supported upon its vehicle, is tilted to one side to empty its contents and in tilting, travels from a verticle position to a full dump position (to be described more fully hereinafter).

It is not uncommon for a part of the slag and/or mixture of slag and metal and, in some cases, metal to solidify within the pot and there adhere to its inner walls to form a skull which does not fall out when the pot is tilted to empty its contents. Presence of the skull requires that the pot be bumped or impacted at least once and usually several times against a bar or stop member affixed to the vehicle to free and remove the skull.

These slag pots are large and heavy and have capacities of 300–500 cubic feet and more. Their sides slope inwardly from their top periphery at angles of about 15–20° and their bottoms are generally hemispherically shaped. Usually, they are made from cast iron or steel and weigh from about 12½ tons for a 300 cubic foot pot to about 22½ tons for a 500 cubic foot pot. The 300 cubic foot pot holds up to 24 tons of slag and the 500 cubic foot pot up to 40 tons of slag.

Heretofore, dumping apparatus for these slag pots has included a rack and pinion combination actuated by a motor and connected to a trunnion ring which mounts the slag pot. To avoid accidental dumping, a lock device is required for the rack and pinion combination and sometimes a second lock device is used.

Production of expanded slag results from pouring through a spray or stream of water or into a body of water hot blast furnace slag which may be molten, solid, or a mixture of molten and solid particles. To achieve good yields of expanded slag, the blast furnace slag must not be poured in large amounts quickly through the water spray or stream but in small amounts, preferably slowly to afford the water a good opportunity to contact a maximum amount of hot slag. When these pots are full or substantially full of slag, it has been extremely difficult and, in some cases, impossible to avoid pouring large amounts of the hot slag quickly through the water at the start of dumping, thereby encountering low yields of expanded slag. This is because the pots are large and heavy and because a small amount of angular travel of the pot from its vertical position upon commencement of dumping empties a substantial amount of slag therefrom. Additionally, lack of a good control over angular velocity of the pot at the start of the dumping has contributed materially to the low yields of expanded slag.

Ability to bump or impact the slag pot hardily and sharply against the bar or stop member on its car to loosen and remove skulls at the dump is an important requirement because special handling of pots for skull removal is both inconvenient and costly.

Our invention permits elimination of the lock devices for the dumping apparatus and provides a good control over angular velocity of the pot at the start of dumping together with ability to bump and impact sharply and hardily for removal of skulls. Specifically, our invention relates to apparatus for dumping a slag pot carried by a wheeled vehicle having a frame and comprises a combination having a trunnion ring normally disposed in a horizontal position upon the frame where it is adapted to receive and support the slag pot in a vertical position. This ring has at each of two substantially diametrically opposite sides first and second support members which straddle its central longitudinal axis and which are disposed upon the frame. One of the first and second support members forms with its counterpart at the opposite diametrical side of the ring a pivot mounting therefor upon the frame to permit rotation thereof about a longitudinal axis offset laterally from the central longitudinal axis. Thus, rotation of the ring about this offset longitudinal axis causes the pot carried by the ring to travel from its vertical position to a full dump position whereat its contents are emptied therefrom.

The pivot mounting is located laterally a distance from the vertical center line of the pot such that the center of gravity of the pot and its contents are within the span of wheels of the vehicle widthwise during travel of the pot from its vertical position to its full dump position. This pivot mounting is further located laterally a distance from the vertical center line of the pot such that the center of gravity of the pot and its contents when in full dump position are above said pivot mounting and substantially in an area adjacent a vertical line which extends through the pivot mounting.

Operatively connected to the trunnion ring to rotate it and the pot carried thereby about the pivot mounting to move the pot from the vertical position to the full dump position is a motor such as a fluid-under-pressure one. Connected to the motor is a fluid-under-pressure system which includes a first fluid flow means for controllably delivering fluid under pressure to the motor to impart a regulated slow rate of travel to the pot about its pivot mounting from the vertical position through at least a first portion of rotation towards the full dump position and preferably for substantially the rotation from the vertical to the full dump position. The system also includes a second fluid flow means for delivering fluid under pressure to the motor to rotate the pot about its pivot mounting through an arc from the full dump position towards the vertical position to a bumping position whereat the pot is spaced apart from a stop member affixed to the vehicle. Additionally, the fluid-under-pressure system has a volume fluid means for delivering a substantial volume of fluid under pressure to the motor for impacting the pot against the stop member from the bumping position.

In the accompanying drawings, we have shown preferred embodiments of our invention in which:

FIGURE 1 is a side elevation view of a slag pot mounted upon a railroad car for transporting the pot and equipped with our invention for dumping same;

FIGURE 2 is a plan view of the slag pot and car of FIGURE 1;

FIGURE 3 is an enlarged view along the line III—III of FIGURE 1;

FIGURE 4 is a section view along the line IV—IV of FIGURE 3;

FIGURE 5 is an end view of the car of FIGURE 1 with the pot in full dump position and with some parts omitted;

FIGURES 6 and 7 are diagrammatic views of the slag pot of FIGURE 1 showing one way of locating its pivot mounting according to our invention;

FIGURE 8 is an end elevation view of a modification of our invention;

Figure 9:
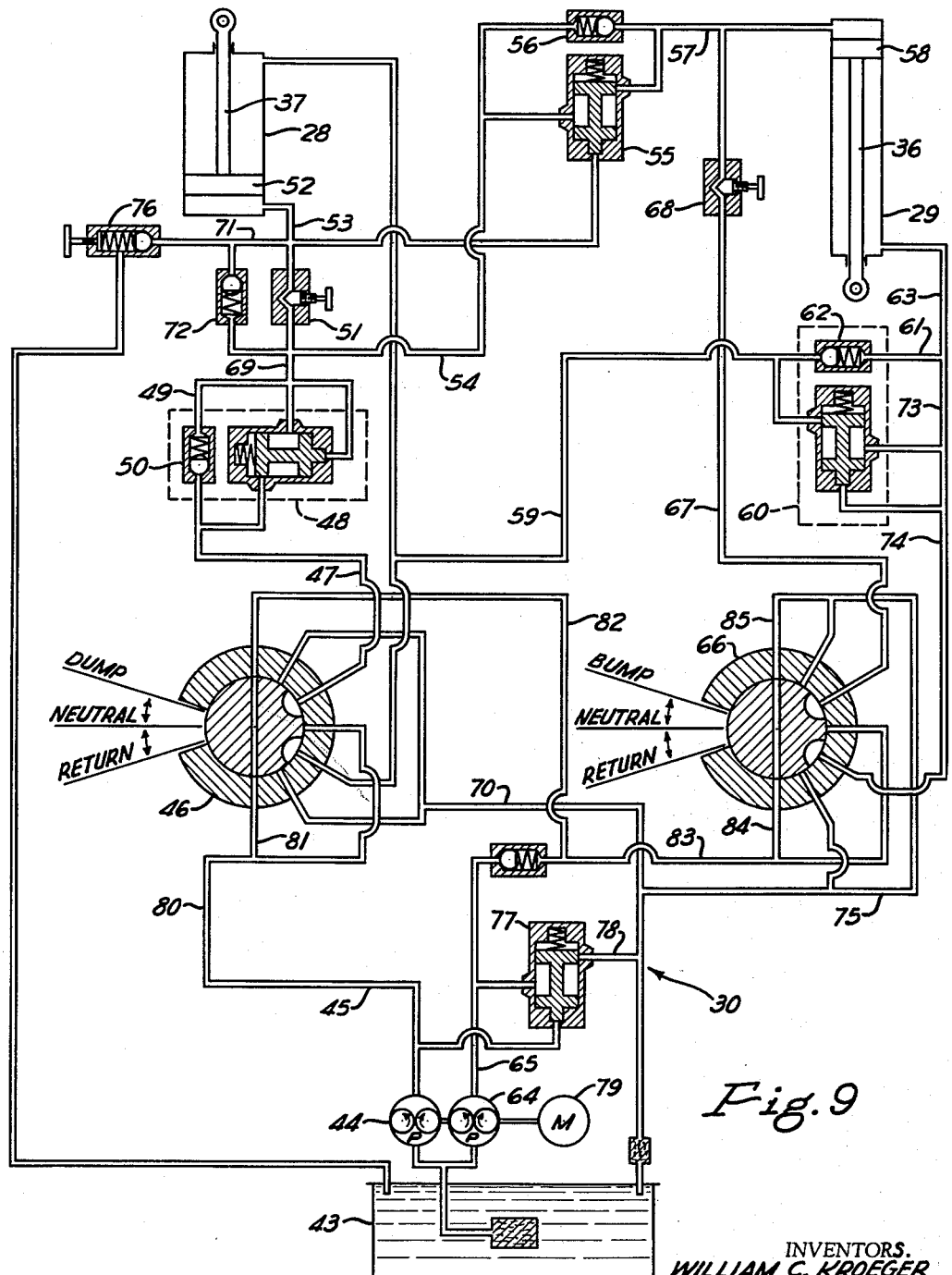
FIGURE 9 is a schematic drawing of one hydraulic system for operating the dumping apparatus of FIGURE 1 according to our invention.

Referring to FIGURES 1–8 inclusive, a railroad car 1 has a pair of conventional wheel trucks 2 at each end of a horizontal frame 3 specifically designed to accommodate a slag pot 4 in a vertical position and to permit dumping same to one side thereof. The frame 3 includes a pair of spaced apart posts 5 made from beams which mount a trunnion ring 6 through two pins or support members 7 and 8 at each of two substantially diametrically opposite sides. As shown in FIGURE 1, the ring is normally in a horizontal position where it receives the slag pot 4 which is joined thereto by conventional lock devices (not shown).

The two pins at each of two opposite sides of the ring 6 straddle its central longitudinal axis 10 and pin 7 and its counter-part pin 7a on the opposite side of the ring form a pivot mounting for the ring (pin 8a is the counterpart of pin 8). Thus, pins 7 and 7a provide an axis of rotation 9 (FIGURES 6 and 7) of the ring substantially parallel to the central longitudinal axis 10 but offset laterally therefrom. Rotation of the ring about this offset axis turns the pot carried thereby transversely of the longitudinal axis 10 of the car and moves the pot from its vertical position (FIGURES 1, 2 and 6) to a full dump position (FIGURES 5 and 7) defined by engagement of its leading side 11 with a bumping bar or stop 12 affixed to the frame 3. In full dump position (FIGURE 7), the pouring lip 13 of the pot 4 extends out over rail 14 of a track 15 which includes companion rail 16 and over which the car runs so that all of the slag is emptied to the side of the track and not onto it. The leading side 11 of the pot 4 forms an acute angle θ (FIGURE 7) of about 35–45° with a plane disposed parallel to the surface of the ground when the pot is at full dump position.

Location of the pins 7 and 8 is important because the center of gravity of the pot and its contents must be inside or between the rails 14 and 16 for all positions thereof during rotation from the vertical position to the full dump position to prevent the car toppling over from the track. Thus, the location of the pivot mounting is dependent upon the center of gravity of the pot when filled, partially filled, and empty. Referring to FIGURES 6 and 7, line 17 represents the vertical center line of the car and coincides with the vertical center line of the pot when it is in vertical position and line 18 represents the center line of the pot in FIGURE 7 shown rotated out of vertical position. Point A on lines 17 and 18 represents the center of gravity of the pot filled with slag, point C the center of gravity of the pot when empty, and point B the center of gravity of the pot when half full of slag. The highest center of gravity encountered is at point A and the lowest center of gravity at point B for all the different amounts of filling of the pot.

Additionally, location of the pivot mounting depends upon position of the center of gravity of the pot with some slag and/or metal therein at full dump position from the standpoint of bumping it to remove skull. Preferably, for good bumping, point B should be on the outside of the pivot mounting, represented in FIGURES 6 and 7 by the axis of rotation 9 relative to the center line 17 of the car, when the pot is in full dump position (shown in solid line, FIGURE 7) and should be substantially directly over the pivot mounting when the pot is at a bumping position, one about 10°–20° from full dump position back towards vertical position and shown in dash lines in FIGURE 7. Then, position of the center of gravity when the pot is at bumping position assists in obtaining a sharp and hard impact of the leading side 11 against the bumping bar 12. Specifically, such position permits utilization of the weight of the pot and it contents and the force of gravity to increase angular velocity of the pot in traveling from the bumping position into engagement with the bar 12. However, location of point B a small amount on the inside of the pivot mounting, when the pot is in bumping position, is satisfactory. Thus, further location of the pivot mounting includes taking into account a distance laterally from the vertical center line of the pot such that the center of gravity of the pot and its contents when substantially half full and when in bumping position is above the pivot mounting and in an area substantially adjacent a vertical line, such as line 19 (FIGURE 7), which extends through the pivot mounting.

Referring to FIGURES 6 and 7, one method of locating the pivot mounting uses mathematical formulas and a vertical plane (represented by line 20 in FIGURE 7) positioned a small distance such as 2″ inside that rail on the side of the car at which dumping occurs. A second line 20 representing a second vertical plane 2″ inside the other rail 16 is shown in FIGURE 7 whereby L—4 is the distance between the two lines 20. During rotation of the pot from vertical position to full dump position, the center of gravity of the pot and of its contents should not travel to the outside of this vertical plane. As shown in FIGURE 7, point A is at but not outside the vertical plane when the pot is in full dump position. In FIGURES 6 and 7, points A and B have already been identified and M represents the distance therebetween, L represents the track gauge, $\theta$ the angle which the leading side 11 of the pot forms with a horizontal line when the pot is in full dump position, $\alpha$ the angle which the pot sides form with a vertical line parallel to the vertical center line 18 thereof (18a represents the center line of the pot in bumping position), $y$ a distance between side 11 of the pot 4 and the bumping bar 12 when the pot is in bumping position, $x$ a distance selected according to relative and particular pot dimensions so that when point B is over the pivot mounting 9, the distance $y$ is such that adequate bumping occurs for removal of skulls, for pots 300 to 500 cubic foot capacity $x$ is about 10% to 20% of M, and $L-4/2$ the distance between the center line of the car and the plane 20 (see column 4, lines 25–32. The angle $\theta-\alpha$ is that angle which the vertical center line 18 makes with a horizontal line when the pot is at full dump position (FIG. 7). Then with M as the hypotenuse of a right angle triangle and with the pot in full dump position (FIGURE 7) where point A is at the vertical plane 20 and 2″ inside the rail 14, location of the pivot mounting substantially directly beneath point B results results from subtraction from $L-4/2$ a quantity $$M+x \cos (\theta-\alpha)$$

Accordingly, lateral location of the pivot mounting from line 17 (FIGURE 6) is an amount equal to $L-4/2 -[(M+x) \cos (\theta-\alpha)]$ which is represented by line 21. The vertical location of the pivot mounting from terminal 22 of the line 21 is equal to $[(M+x) \sin (\theta-\alpha)]$.

In iron and steel mill operations, the angle $\theta$ is usually between about 40° and 45° with 40° preferred for liquid slag and 45° for solidified slag.

FIGURE 4 shows the pivot pin 7 disposed in a spherical bearing 23 which is located upon a seat 24 of a rotatable sleeve 25 carried by a housing 26. The post 5 supports the housing and a retaining ring 27 assists to maintain the spherical bearing in its position upon the seat 24.

Operation of two double acting fluid-under-pressure cylinder motors 28 and 29 (FIGURES 3 and 5) dump the pot. These motors are operatively connected to a fluid-under-pressure system 30 (FIGURE 9) which preferably is hydraulic but may be pneumatic or a combination of hydraulic and pneumatic.

Motor 28 is trunnion mounted upon a cylinder yoke or arm 31 whose one end 32 rotates about the sleeve 25 (FIGURE 4) and whose other end 33 rests upon an upright 34 when in horizontal position (FIGURE 3). The other motor 29 has a trunnion connection 35 to the cylinder yoke adjacent the end 33 and has one end of its piston rod 36 pivotally anchored to the frame 5.

The motor 28 has its piston rod 37 joined to a trunnion yoke 38 which has the pin 8 of the trunnion ring attached thereto. This trunnion yoke 38 has a rotatable mounting upon the sleeve 25 whereby it revolves about the pin 7 independently of turning of the cylinder yoke 31 thereabout.

In operation of the motor 28 its piston and piston rod raise the trunnion yoke 38 up off a platform 39 of the cylinder yoke on which it rests when the trunnion ring 6 is in horizontal position and the pot in its vertical position and turns it about the sleeve 25 until its shoulder 40 engages a stop member 41 attached to the cylinder yoke 31. During rotation of the trunnion yoke into engagement with the stop member, the pot commences to dump its contents and its center line travels through a counterclockwise arc of about 68¾°, viewing FIGURES 1, 5, 6 and 7. Dash lines 42 (FIGURE 3) show the position of the motor 28 when the shoulder has engaged the stop member. In this revolution of the pot from the vertical position through the 68¾° arc, slow controlled rate of travel is important to produce a good yield of expanded slag. Unless such a rate of travel is achieved in the first part of the dumping operation, a large amount of slag quickly pours through the water, thereby effecting low yields of expanded slag.

Engagement of the shoulder 40 with the stop member 41 completes the work of the motor 28 in dumping the pot and the motor 29 then takes over and turns the pot about the pivot mounting so that its center line traverses an additional 43¼° counterclockwise arc to bring the leading side 11 into contact with the bumper bar 12 by revolving the cylinder yoke 31 with the trunnion yoke 38 about the sleeve 25. FIGURE 5 shows the positions of the two motors 28 and 29 when the pot 4 is in full dump position. Usually the path of travel of the center line of the pot from vertical position to full dump position is an arc of about 105°–120°.

FIGURE 9 shows one fluid-under-pressure system 30 which provides both the slow controlled angular rate of travel of the pot for the dumping operation and the sharp bumping or impacting action of the pot against the bar 12 from the bumping position to the full dump position. This system comprises an oil reservoir 43 from which a high pressure pump 44, such as one having a capacity of 8 gallons per minute at 2000 p.s.i. sends oil through a line 45 to a first spring centered tandem 4-way valve 46. For operation of the motor 28, oil then flows through line 47 to a first counterbalance valve 48 where it traverses a free-flow passageway 49 which includes a check valve 50. From the first counterbalance valve 48, the oil flows through an adjustable flow control valve 51 and then to the underside of the piston 52 of the motor 28 through line 53. This flow control valve 51 regulates the amount of high pressure oil entering the motor 28 to obtain the regulated angular velocity of the pot during the first portion of the dumping operation.

When motor 28 has completed its work, oil then flows through line 54 to a pilot operated sequence valve 55 which includes a check valve 56, through line 57 to the motor 29 at the top side of its piston 58 therein for completion of the dumping operation by advancing the pot to full dump position.

To bump the pot in the event all its contents are not emptied, oil flows from the first 4-way valve 46 through line 59 to a second counterbalance valve 60, through its free-flow passageway 61, including a check valve 62 and line 63, to the motor 29 at the underside of its piston, until the pot moves 10°–20° off of the bumping bar 12 back towards vertical position. Then, to impact the pot against the bar, a low pressure, high volume pump 64, such as one having a capacity of 50 gallons per minute at 400 p.s.i., forces the oil from the reservoir 43 through line 65 to a second spring centered tandem 4-way valve 66, thence through line 67 having a needle valve 68 to the motor 29 at the top side of its piston 58. Delivering this high volume, low pressure oil drives the pot quickly downwardly into a sharp impact with the bar to loosen the skull therein. Of course, the pot can be bumped or impacted as many times as necessary to loosen the skull.

Return of the pot from full dump position to vertical position results from flow of oil from the first 4-way valve 46 through line 59, the second counterbalance valve 60 and line 63 to the bottom side of the piston 58 of the motor 29. Oil on the top side of the piston 58 returns to the reservoir through line 57, sequence valve 55, line 54, line 69, first counterbalance valve 48, first 4-way valve 46 via its passageway 70. When the piston 58 has reached the end of its return stroke, then oil enters motor 28 on the top side of its piston 52 and completes rotation of the pot back to vertical position. As this occurs, oil exits from the motor 28, through line 53, line 71, check valve 72, line 69, counterbalance valve 48, line 47, first 4-way valve 46 via its passageway 70 to the reservoir 43.

The counterbalance valve 60 provides a back pressure for the motor 29 as the pot is dumped and the center of gravity of the pot and its contents is outside the pivot mounting to avoid an excessively fast fall of the pot to full dump position and creation of a vacuum on the top side of the piston 58. However, for bumping the pot, the first 4-way valve 46 does not function and, accordingly, oil exits from the motor 29 and flows directly through the counterbalance valve 60 via passageway 73 unimpeded by any back pressure, through line 74, the second 4-way valve 66 and line 75 to the reservoir.

The other counterbalance valve 48 functions similarly regarding motor 28 when the pot is returned to vertical position and the center of gravity thereof is inside the pivot mounting. Thus, an excessively fast fall of the pot back to vertical position and generation of a vacuum on the top side of the piston 52 is avoided.

An adjustable pressure relief valve 76 is in connection with motor 28 and sequence valve 55 through line 71 to take care of excessive pressure build-ups.

A pilot operated unloading valve 77 returns the 50 gallon per minute oil from the pump 64 to the reservoir through line 78. Such an unloading valve is preferable because both pumps are driven by a single electric motor 79.

When the 4-way valve 46 is not in operation and the pumps are operating, oil courses therethrough via passageways 80 and 81 to lines 82 and 83, then through the second 4-way valve 66 via its passageways 84 and 85 to line 75 and the reservoir.

Conventional handles (not shown) mounted upon the 4-way valves can be used to operate same for dumping and impacting the slag pot.

A modification of our invention (FIGURE 8) uses a single double acting cylinder motor 86 instead of the two cylinder motors. This single motor is trunnion mounted upon the post 5 and has its piston rod 87 pivotally attached to a yoke 88 which is rotatably disposed at one end 89 upon the pivot mounting similarly to the cylinder yoke 31. The yoke receives the pin 8 of the trunnion ring 6 adjacent its other end 90 which rests upon a vertical bracket 91 affixed to the post 5. Operation of the motor 86 rotates the pot about its pivot mounting from the vertical position to full dump position and therein provides a regulated slow rate of travel during at least the first part of dumping and also a sharp bumping against the bumping bar 12 from a bumping position.

Figure 10:
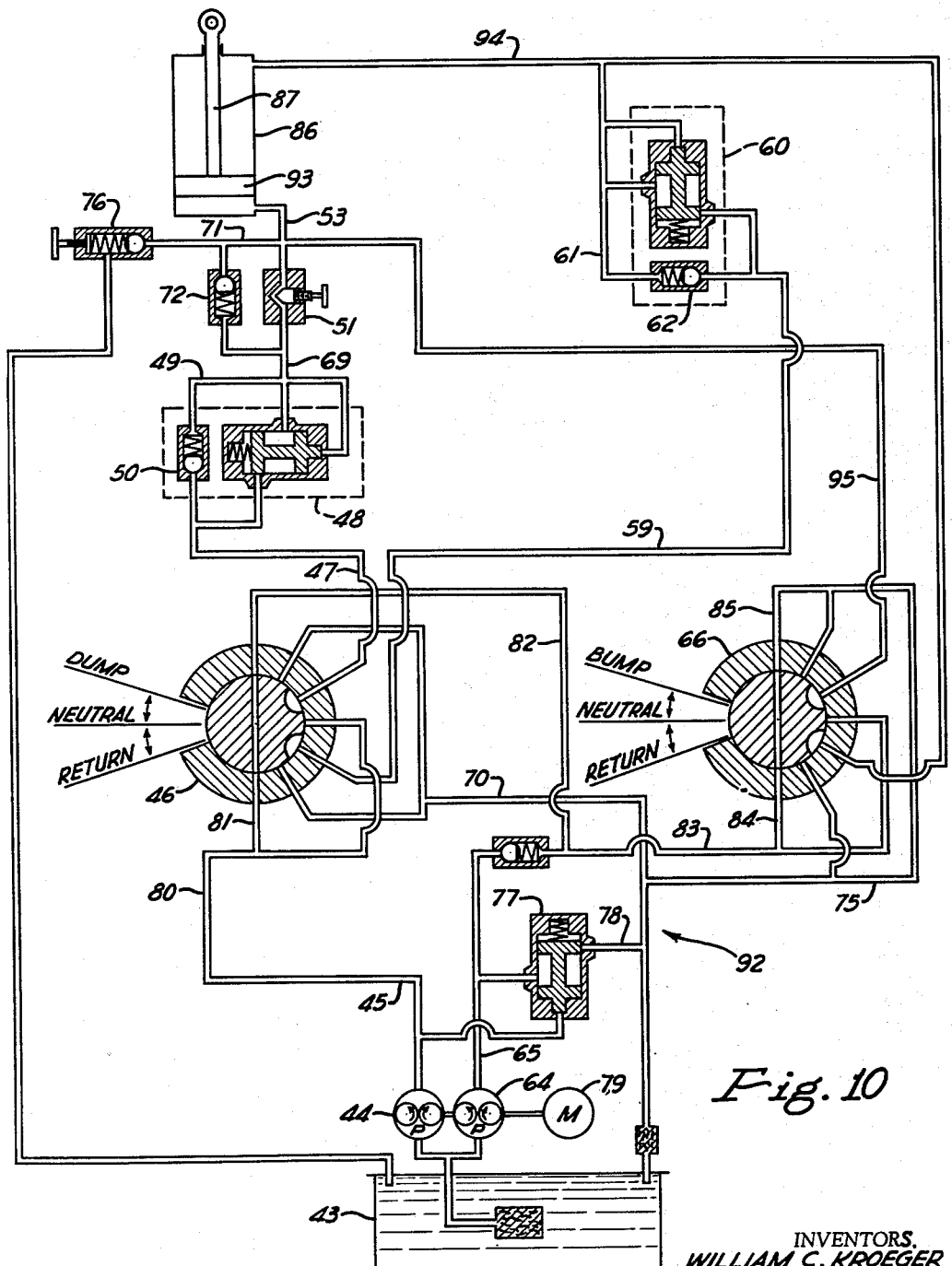
FIGURE 10 is a schematic drawing of one hydraulic system for operating the dumping apparatus of the car of FIGURE 8 according to our invention.

FIGURE 10 shows a fluid-under-pressure system 92 similar to the one of FIGURE 9 except that it operates the single motor 86 for both the slow rate of travel and the impacting and does not have the sequence valve 55. Those components in the system of FIGURE 10 which are the same as corresponding components in the system of FIGURE 9 have the same reference numerals.

In the system of FIGURE 10, slow regulated rate of travel of the pot results from flow of oil through line 45, 4-way valve 46, line 47, counterbalance valve 48, line 69, adjustable flow control valve 51 and line 53 to the underside of piston 93 of the motor 86. Then, for impacting the pot, it is lifted from full dump position to bumping position by flow of oil from 4-way valve 46, through line 59, counterbalance valve 60, and line 94 to the upper side of the piston 93. Next, impacting occurs when a large volume of low pressure oil exits from 4-way valve 66 and travels through lines 95 and 53 to the underside of the piston 93.

Our invention has important advantages for the iron and steel mill industries which use slag pots because it incorporates into one apparatus slow regulated rate of travel of the pot through at least the first portion of the dumping operation and ability to sharply impact and bump the pot together with elimination of locks required by the rack and pinion dumping devices.

While we have shown and described preferred embodiments of our invention, it is understood that it may be otherwise embodied within the scope of the following claims.

We claim:
1. In apparatus for dumping a slag pot carried by a wheeled vehicle having a frame thereon wherein dumping is to one side of said vehicle, the invention comprising a trunnion ring normally disposed in a horizontal position upon said frame for mounting said slag pot in a vertical position, said trunnion ring having at substantially diametrically opposite sides first and second support members on each side which straddle its central axis of rotation and which are disposed upon said frame, said ring having one of said first and second support members forming with its counterpart at the opposite diametrical side of said ring a pivot mounting therefor upon said frame to permit rotation thereof about an axis offset laterally from said central axis whereby rotation of said ring about its offset axis causes said pot carried by said ring to travel from said vertical position to a full dump position whereat its contents are emptied therefrom, said vehicle having a portion disposed to define said full dump position by engagement with a side of said pot, said pivot mounting being located laterally a distance from the vertical center line of said pot such that the center of gravity of said pot and its contents is within the span of the wheels widthwise of said vehicle during travel of said pot from said vertical position to said full dump position, motor means operatively connected to said ring to rotate same about said pivot mounting to move said pot from said vertical to said full dump position, means forming a fluid under pressure system operatively connected to said motor means and including a fluid flow means for delivering a controlled amount of fluid under pressure to said motor means to impart a regulated slow rate of travel to said pot about said pivot mounting from said vertical position through at least a first portion of rotation towards said full dump position, including means for delivering fluid under pressure to said motor means to rotate said pot through an arc to a bumping position whereat said pot is spaced apart from said portion of said vehicle and including volume fluid means for delivering a substantial amount of fluid under pressure to said motor means for impacting said pot against said portion from said bumping position.

2. The invention of claim 1 characterized by said pivot mounting being further located laterally a distance from said vertical center line of said pot such that the center of gravity of said pot and its contents when in a bumping position are above said pivot mounting and substantially in an area adjacent a vertical line which extends through said pivot mounting.

3. The invention of claim 1 characterized by an arm member having a pivot mounting upon said frame for rotation thereabout, having one of said other of said first and second support members of said ring joined thereto and being connected to said fluid-under-pressure motor means so that operation of said motor means rotates said pot about said ring pivot mounting by turning of said arm about its pivot mounting.

4. In apparatus for dumping a slag pot carried by a wheeled vehicle having a frame thereon wherein dumping is to one side of said vehicle, the invention comprising a trunnion ring normally disposed in a horizontal position upon said frame for mounting said slag pot in a verticle position, said trunnion ring having at substantially diametrically opposite sides first and second support members on each side which straddle its central axis of rotation and which are disposed upon said frame, said ring having one of said first and second support members forming with its counterpart at the opposite diametrical side of said ring a pivot mounting therefor upon said frame to permit rotation thereof about an axis offset laterally from said central axis whereby rotation of said ring about its offsets axis causes said pot carried by said ring to travel from said vertical position to a full dump position whereat its contents are emptied therefrom, said vehicle having a portion located to define said full dump position of said pot by engagement with a side thereof, said pivot mounting being located laterally a distance from the vertical center line of said pot such that the center of gravity of said pot and its contents are within the span of the wheels widthwise of said vehicle during travel of said pot from said vertical position to said full dump position, motor means operatively connected to said ring to rotate same about said pivot mounting to move said pot from said vertical to said full dump position, means forming a fluid under pressure system operatively connected to said motor means and including means for delivering fluid under pressure to said motor means to rotate said pot about said pivot mounting through an arc to a bumping position whereat said pot is spaced apart from said portion of said vehicle and including volume fluid means for delivering a substantial amount of fluid under pressure to said motor means for impacting said pot against said portion of said, portion and said vehicle from said bumping problem.

5. The invention of claim 4 characterized by said pivot mounting being further located laterally a distance from said vertical center line of said pot such that the center of gravity of said pot and its contents when in a bumping position is above said pivot mounting and substantially in an area adjacent a vertical line which extends through said pivot mounting.

6. In apparatus for dumping a slag pot carried by a wheeled vehicle having a frame thereon wherein dumping is to one side of said vehicle, the invention comprising a trunnion ring normally disposed in a horizontal position upon said frame for mounting said slag pot in a vertical position, said trunnion ring having at substantially diametrically opposite sides first and second support members on each side which straddle its central axis of rotation and which are disposed upon said frame, said ring having one of said first and second support members forming with its counterpart at the opposite diametrical side of said ring a pivot mounting therefor upon said frame to permit rotation thereof about an axis offset laterally from said central axis whereby rotation of said ring about its offset axis causes said pot carried by said ring to travel from said vertical position to a full dump position whereat its contents are emptied therefrom, said vehicle having a portion located to define said full dump position of said pot by engagement with a side thereof, said pivot mounting being located laterally a distance from the vertical center line of said pot such that the center of gravity of said pot and its contents are within the span of the wheels widthwise of said vehicle during travel of said pot from said vertical position to said full dump position, first and second motors operatively connected to said ring to rotate same about said pivot mounting to move said pot from said vertical to said full dump position, means forming a fluid under pressure system operatively connected to said motors, said system including first fluid flow means for controllably delivering fluid under pressure to said first motor to impart a regulated slow rate of travel to said pot about said pivot mounting from said vertical position through a first portion of rotation towards said full dump position and for delivering fluid under pressure to said second motor for completing rotation of said pot into full dump position by engagement with said stop member, including second fluid flow means for delivering fluid under pressure to said second motor for rotating said pot about said pivot mounting through an arc to a bumping position whereat said pot is spaced apart from said portion of said vehicle and including volume fluid means for delivering a substantial volume of fluid under pressure to said second motor for impacting said pot against said portion of said member from said bumping position.

7. The invention of claim 6 characterized by said pivot mounting being further located laterally a distance from said vertical center line of said pot such that the center of gravity of said pot and its contents when in a bumping position are above said pivot mounting and substantially in an area adjacent a vertical line which extends through said pivot mounting.

8. The invention of claim 7 characterized by a first arm having a pivot mounting upon said frame for rotation thereabout, having one of said other of said first and second support members of said ring joined thereto and being connected to said first motor so that operation of said first motor rotates said pot about said ring pivot mounting through a first portion of rotation from said vertical position towards said full dump position and by a second arm having a pivot mounting upon said frame for rotation thereabout, having said first motor supported thereon and being connected to said second motor so that operation of said second motor turns said second arm about its pivot mounting to move said pot to full dump position and between bumping and full dump positions.

9. The invention of claim 6 characterized by a first arm having a pivot mounting upon said frame for rotation thereabout, having one of said other of said first and second support members of said ring joined thereto and being connected to said first motor so that operation of said first motor rotates said pot about said ring pivot mounting through a first portion of rotation from said vertical position towards said full dump position and by a second arm having a pivot mounting upon said frame for rotation thereabout, having said first motor supported thereon and being connected to said second motor so that operation of said second motor turns said second arm about its pivot mounting to move said pot to full dump position and between bumping and full dump positions.

References Cited by the Examiner
UNITED STATES PATENTS

| | | | |
|---|---|---|---|
| 508,998 | 11/93 | Thacher | 105—271 |
| 652,198 | 6/00 | Stewart | 105—271 |
| 817,714 | 4/06 | Howard | 105—273 X |
| 1,191,268 | 7/16 | Astrom | 105—270 |
| 2,047,473 | 7/36 | Howat | 105—272 |
| 2,189,052 | 2/40 | Anthony | 298—22 |
| 2,235,795 | 3/41 | Blest | 105—272 |
| 2,319,840 | 5/43 | Barrett | 298—22 |
| 2,424,670 | 7/47 | Shimer | 298—22 |
| 2,476,694 | 7/49 | Bourne-Vanneck | 298—22 |
| 2,889,172 | 6/59 | Hoff | 298—10 |
| 2,963,185 | 12/60 | Jones | 298—20 |

FOREIGN PATENTS

| | | |
|---|---|---|
| 472,457 | 4/14 | France. |
| 1,240,069 | 7/60 | France. |

OTHER REFERENCES
German application 1,055,934, printed April 16, 1959 (K1 20c15).

ARTHUR L. LA POINT, *Primary Examiner.*

LEO QUACKENBUSH, EUGENE G. BOTZ,
*Examiners.*